(12) United States Patent
Yoon et al.

(10) Patent No.: US 10,405,098 B2
(45) Date of Patent: Sep. 3, 2019

(54) DISPLAY DEVICE

(71) Applicant: LG Display Co., Ltd., Seoul (KR)

(72) Inventors: SeungHwan Yoon, Seoul (KR); KiDuk Kim, Paju-si (KR); DongKyun Lim, Goyang-si (KR); JaiHyuk Lee, Gwangju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/051,784

(22) Filed: Aug. 1, 2018

(65) Prior Publication Data

US 2019/0141450 A1    May 9, 2019

(30) Foreign Application Priority Data

Nov. 6, 2017 (KR) .................. 10-2017-0146437

(51) Int. Cl.
| | |
|---|---|
| *H04R 7/04* | (2006.01) |
| *H04R 1/02* | (2006.01) |
| *G02F 1/1362* | (2006.01) |
| *G02F 1/1333* | (2006.01) |
| *G02F 1/1368* | (2006.01) |
| *G06F 1/16* | (2006.01) |

(52) U.S. Cl.
CPC .............. *H04R 7/045* (2013.01); *H04R 1/028* (2013.01); *G02F 1/1368* (2013.01); *G02F 1/133308* (2013.01); *G02F 1/136286* (2013.01); *G02F 2001/133314* (2013.01); *G02F 2202/28* (2013.01); *G06F 1/1605* (2013.01); *H04R 2499/15* (2013.01)

(58) Field of Classification Search
CPC ...... H04R 5/02; H04R 2499/15; H04R 7/045; H04R 1/026; H04N 5/642; G02F 1/133308; G02F 1/136286; G02F 1/1368; G02F 2001/133314; G02F 2202/28
See application file for complete search history.

(56) References Cited

U.S. PATENT DOCUMENTS

| | | | |
|---|---|---|---|
| 7,050,600 B2* | 5/2006 | Saiki ................ | H04M 1/03 381/186 |
| 7,764,803 B2* | 7/2010 | Kang ................ | H04R 7/04 381/152 |
| 9,436,320 B2* | 9/2016 | Kang ................ | H04R 17/005 |
| 2009/0097692 A1* | 4/2009 | Sakamoto .......... | H04R 7/045 381/388 |
| 2017/0277359 A1* | 9/2017 | Lee .................. | H04R 17/00 |

* cited by examiner

*Primary Examiner* — Andrew L Sniezek
(74) *Attorney, Agent, or Firm* — Morgan, Lewis & Bockius LLP

(57) ABSTRACT

A display device includes a display module displaying an image, a vibration generating device including at least one sound generating module vibrating the display module, a rear structure disposed on a rear surface of the display module to fix the vibration generating device, and a vibration transfer member disposed between the at least one sound generating module and the display module to extend from the at least one sound generating module to an edge of the display module. Accordingly, a sound pressure level corresponding to a high frequency domain is prevented from being reduced, thereby enhancing the quality of a sound output to a region in front of a display panel.

17 Claims, 10 Drawing Sheets

DISPLAY DEVICE

CROSS-REFERENCE TO RELATED APPLICATIONS

This application claims the benefit of the Korean Patent Application No. 10-2017-0146437 filed on Nov. 6, 2017, which is hereby incorporated by reference as if fully set forth herein.

BACKGROUND

Technical Field

The present disclosure relates to a display device.

Discussion of the Related Art

Recently, as society advances to the information-oriented society, the field of display devices for visually displaying an electrical information signal has rapidly advanced. Consequently, various display devices having excellent performances such as thinness, lightness, and low power consumption are being developed. Examples of the display devices may include liquid crystal display (LCD) devices, field emission display (FED) devices, organic light emitting display devices, etc.

Generally, display devices display an image on a display panel, but a separate speaker should be installed for providing a sound. In a case where a speaker is installed in a display device, a traveling direction of a sound output through the speaker is a direction toward a side end or an upper/lower end of the display panel, instead of a front surface or a rear surface of the display panel, and thus, the sound does not travel in a direction toward a viewer who is watching an image in front of the display panel, whereby an immersiveness of the viewer watching the image is hindered.

Moreover, in a case where a speaker included in a set device such as televisions (TVs) is provided, the speaker occupies a certain space, and due to this, the design and space disposition of the set device are limited. In order to solve such a problem, conventional display devices may vibrate a display panel to output a sound to a region in front of the display panel. However, a vibration transfer ability of the display panel is reduced in a high frequency domain, causing the reduction in clearness of a sound.

Moreover, since a vibration transfer ability of a display panel is reduced, a sound pressure level is reduced, and in this case, by increasing an applied voltage so as to compensate for the loss of the sound pressure level, power consumption increases. In order to solve such a problem, it is required to develop display devices which enable a vibration transfer ability of a display panel to be enhanced in the high frequency domain.

SUMMARY

Therefore, the inventors have recognized the above-described problems and have made various experiments so that when watching an image in front of a display panel, a traveling direction of a sound becomes a direction toward a front surface of the display panel, and thus, sound quality is enhanced. Through the various experiments, the inventors have implemented a display device having a new structure, which outputs a sound having a traveling direction that is a direction toward a front surface of a display panel, thereby enhancing sound quality.

Accordingly, embodiments of the present disclosure are directed to a display device that substantially obviates one or more problems due to limitations and disadvantages of the related art.

An aspect of the present disclosure is to provide a display device that transfers vibration, generated by a vibration generating device, to a display panel via a vibration transfer member to prevent a sound pressure level from being reduced, thereby enhancing the quality of a sound output to a region in front of the display panel.

Another aspect of the present disclosure is to provide a display device that includes a vibration transfer member for transferring a vibration having a high frequency domain generated by a vibration generating device to an edge of a display module, and thus, prevents a sound pressure level from being reduced in the high frequency domain, thereby enhancing flatness of the sound pressure level in a whole frequency domain.

Another aspect of the present disclosure is to provide a display device that transfers a vibration having a high frequency domain generated by a vibration generating device to a display panel via a vibration transfer member and a module adhesive member, and thus, prevents a sound pressure level corresponding to the high frequency domain from being reduced, thereby enhancing clearness of a sound.

Another aspect of the present disclosure is to provide a display device that prevents a sound pressure level corresponding to a high frequency domain from being reduced, thereby minimizing the loss of consumption power.

The objects of the present disclosure are not limited to the aforesaid, but other objects not described herein will be clearly understood by those skilled in the art from descriptions below.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and in accordance with the purpose of the disclosure, as embodied and broadly described herein, a display device comprises a display module displaying an image, a vibration generating device including at least one sound generating module vibrating the display module, a rear structure disposed on a rear surface of the display module to fix the vibration generating device, and a vibration transfer member disposed between the at least one sound generating module and the display module to extend from the at least one sound generating module to an edge of the display module.

Details of other embodiments are included in the detailed description and the drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure. In the drawings.

DETAILED DESCRIPTION

Figure 1:
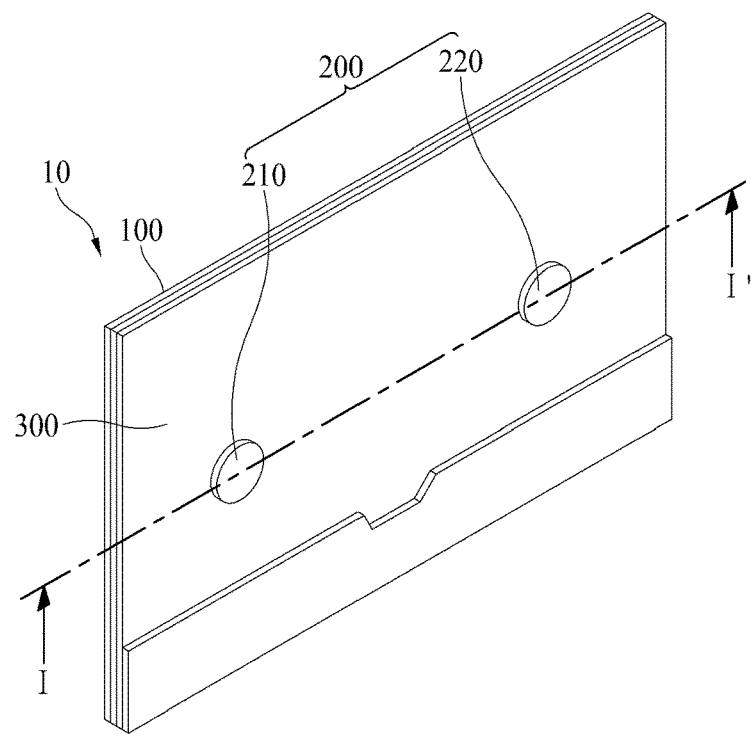
FIG. 1 is a perspective view of a display device according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first", "second", etc. may be used. The terms are merely for differentiating one element from another element, and the essence, sequence, order, or number of a corresponding element should not be limited by the terms. It will be understood that when an element or layer is described as being "connected", "coupled", or "adhered" to another element or layer, the element or layer can be directly connected or adhered to the other element or layer, but the other element or layer can be "disposed" between elements or layers, or elements or layers can be "connected", "coupled", or "adhered" to each other through the other element or layer.

In the present disclosure, examples of a display device may include a narrow-sense display device such as an organic light emitting display (OLED) module or a liquid crystal module (LCM) including a display panel and a driver for driving the display panel. Also, examples of the display device may include a set device (or a set apparatus) or a set electronic device such as a notebook computer, a TV, a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display device may include a narrow-sense display device itself, such as an LCM or an OLED module, and a set device which is a final consumer device or an application product including the LCM or the OLED module.

Depending on the case, an LCM or an OLED module including a display panel and a driver may be referred to as a narrow-sense display device, and an electronic device which is a final product including an LCM or an OLED module may be referred to as a set device. For example, the narrow-sense display device may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to the present embodiment may use all types of display panels such as a liquid crystal display panel, an organic light emitting diode (OLED) display panel, and an electroluminescent display panel, but is not limited to a specific display panel which is vibrated by a sound generating device according to the present embodiment to output a sound. Also, a shape or a size of a display panel applied to a display device according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like).

Moreover, the display panel may further include a backing such as a metal plate attached on the display panel. However, the present embodiment is not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
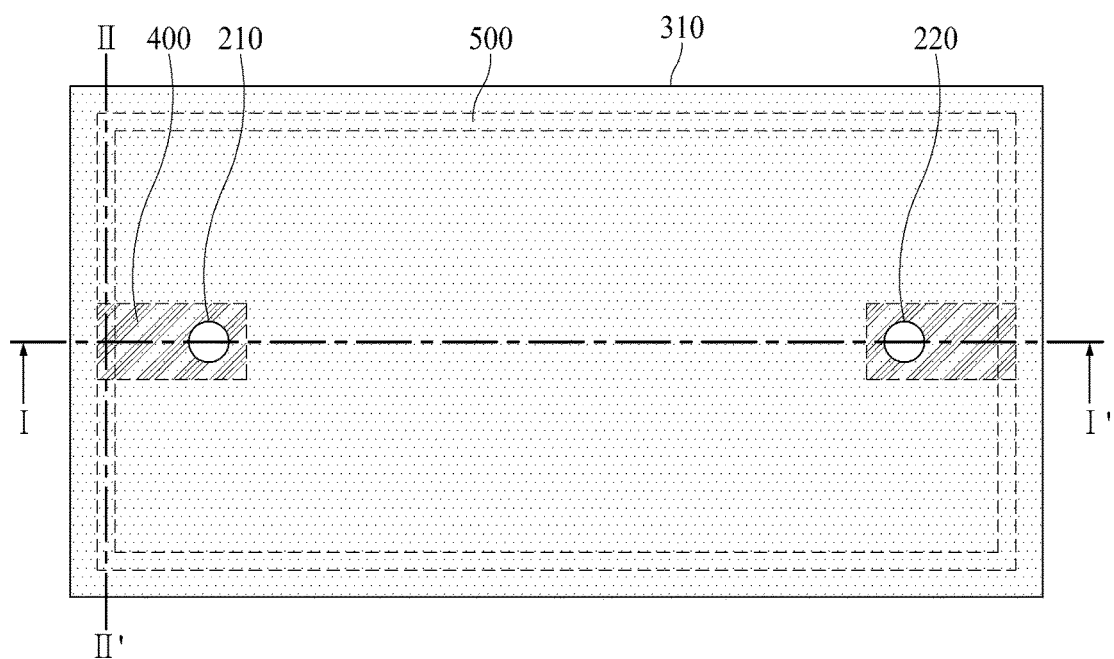
FIG. 2 is a rear view of a display device according to a first embodiment of the present disclosure.
Figure 3:
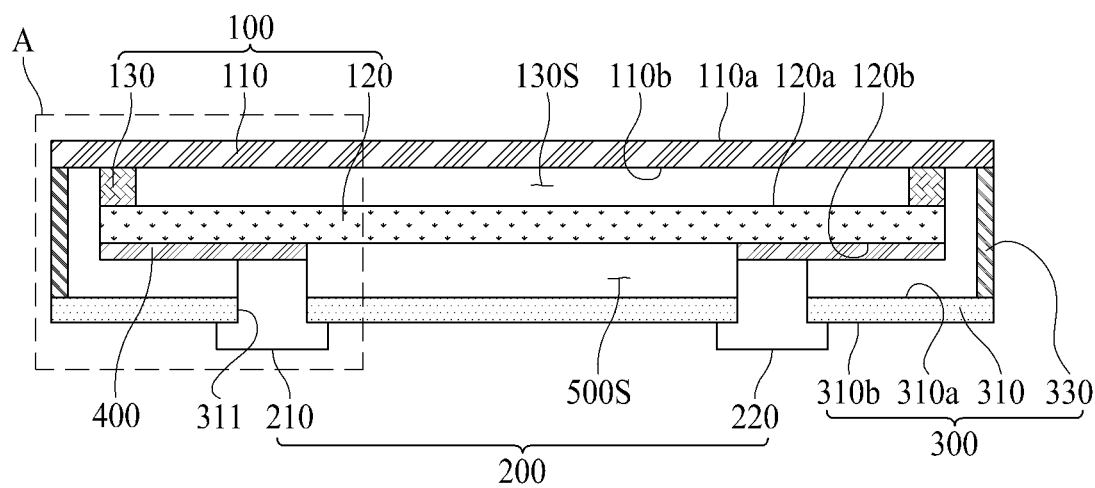
FIG. 3 is a cross-sectional view taken along line I-I' of FIGS. 1 and 2.
Figure 4:
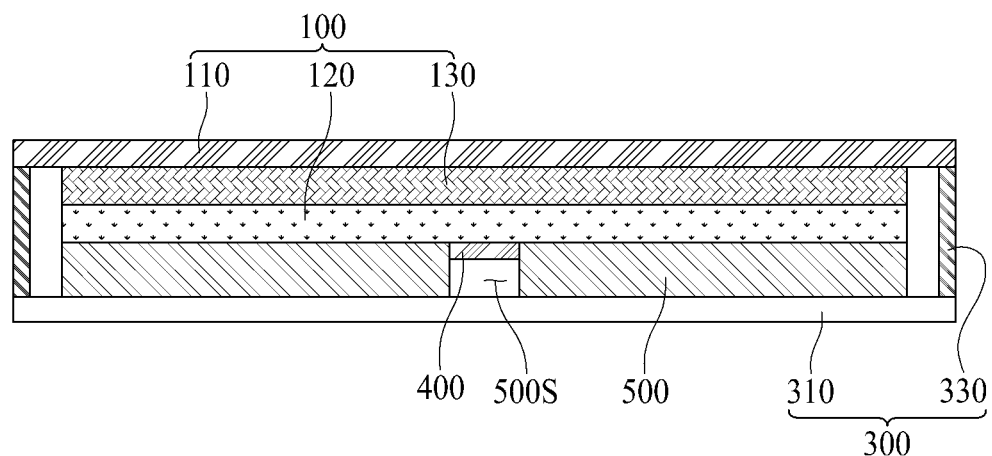
FIG. 4 is a cross-sectional view taken along line II-II' of FIG. 2.

FIG. 1 is a perspective view of a display device 10 according to an embodiment of the present disclosure. FIG. 2 is a rear view of a display device 10 according to a first embodiment of the present disclosure. FIG. 3 is a cross-sectional view taken along line I-I' of FIGS. 1 and 2. FIG. 4 is a cross-sectional view taken along line II-II' of FIG. 2.

Referring to FIGS. 1 to 4, the display device 10 may include a display module 100, a vibration generating device 200, a rear structure 300, a vibration transfer member 400, and an adhesive member 500.

The display module 100 may include a display panel 110 and a backlight unit 120.

The display panel 110 may display an image and may be implemented as all types of display panels such as a liquid crystal display panel, an organic light emitting diode (OLED) display panel, an electroluminescent display panel, etc.

The display panel 110 may include a front surface 110a, which displays an image, and a rear surface 110b onto which light is irradiated from the backlight unit 120. According to an embodiment, the display panel 110 may be a liquid crystal display panel and may display an image by using the light irradiated from the backlight unit 120.

The backlight unit 120 may be disposed on and spaced apart from the rear surface 110b of the display panel 110 with respect to a thickness direction of the display panel 110 and may irradiate the light onto the rear surface 110b of the display panel 110. Also, the backlight unit 120 may be disposed on and spaced apart from a front surface 310a of a rear cover 310 with respect to the thickness direction of the display panel 110. For example, a front surface 120a of the backlight unit 120 may face the rear surface 110b of the display panel 110, and a rear surface 120b of the backlight unit 120 may face the front surface 310a of the rear cover 310.

According to an embodiment, the backlight unit 120 may have an edge type backlight structure which uses a light guide member in an LCD device. According to another embodiment, the backlight unit 120 may include a backlight lighting panel including a self-emitting device layer requiring no separate light source.

The display device 10 may further include a module adhesive member 130. In detail, the module adhesive member 130 may be disposed between a front edge of the backlight unit 120 and a rear edge of the display panel 110. The module adhesive member 130 may be coupled to each of the backlight unit 120 and the display panel 110 and may allow the display panel 110 to be spaced apart from the backlight unit 120. For example, the module adhesive member 130 may provide a gap space 130S between the rear surface of the display panel 110 and the front surface of the backlight unit 120. The backlight unit 120 may receive vibration transferred from the vibration generating device 200, and the display panel 110 may receive the vibration from the backlight unit 120 by using a sound pressure of the gap space 130S. Also, the gap space 130S provided between the display panel 110 and the backlight unit 120 prevents the light of the backlight unit 120 from non-uniformly concentrating on a specific position, thereby enhancing light luminance uniformity.

According to an embodiment, the module adhesive member 130 may have a sealing structure having a four-side-sealed type or a closed loop type. The module adhesive member 130 may surround the gap space 130S provided between the display panel 110 and the backlight unit 120 and may allow a sound pressure generated from the backlight unit 120 to be transferred to the display panel 110. The module adhesive member 130 may directly transfer a vibration of the backlight unit 120 to the display panel 110.

For example, the module adhesive member 130 may include an acryl-based material or a urethane-based material. Here, the module adhesive member 130 may include the acryl-based material which has a relatively better adhesive force and relatively higher hardness than the urethane-based material, in order for the vibration of the backlight unit 120 to be transferred to the display panel 110. In this case, the module adhesive member 130 may include a foam pad including the acryl-based material and an adhesive layer provided on each of a front surface and a rear surface of the foam pad.

As another example, the urethane-based material has a light leakage prevention characteristic which is relatively better than the acryl-based material, and thus, considering prevention of light leakage, the module adhesive member 130 may include the urethane-based material.

The vibration generating device 200 may include at least one sound generating module 210 for vibrating the display module 100. In detail, the vibration generating device 200 may be fixed to the rear structure 300 and may vibrate the display panel 110 through the backlight unit 120 to output a sound to a region in front of the display panel 110. For example, the vibration generating device 200 may generate the sound by using the display panel 110, vibrating along with the vibration of the backlight unit 120, as a vibration plate.

The vibration generating device 200 may pass through the rear structure 300 and may contact the rear surface 120b of the backlight unit 120, and thus, may directly vibrate the backlight unit 120. According to an embodiment, an upper portion of the vibration generating device 200 may be inserted into a perforating part 311 and may be connected to the rear surface 120b of the backlight unit 120, and a lower portion of the vibration generating device 200 may contact and may be fixed to the rear surface 310b of the rear cover 310. Therefore, by using the rear cover 310 of the rear structure 300 as a supporter, the vibration generating device 200 may vibrate according to a vibration signal corresponding to a sound signal associated with an image to vibrate the backlight unit 120, and the display panel 110 may vibrate along with the vibration of the backlight unit 120 to output a sound in a forward direction. Therefore, by using the display panel vibrated based on the vibration of the backlight unit 120 as a vibration plate of a sound device, the display device 10 may output a sound to a region in front of the display panel 110 instead of a region behind and under the display panel 110, and thus, may match a position of an image displayed by the display device 10 with a position of a sound generated by the display device 10, thereby enhancing an immersiveness of a viewer who is watching the image displayed by the display device 10.

According to an embodiment, the vibration generating device 200 may include first and second sound generating modules 210 and 220 which vibrate different regions of the display panel 110. The first and second sound generating modules 210 and 220 may be fixed through the rear cover 310 and may be spaced apart from each other. For example, the first sound generating device 210 may be disposed on a left side of the rear surface 120b of the backlight unit 120 to vibrate a left region of the display panel 110, and the second sound generating device 220 may be disposed on a right side of the rear surface 120b of the backlight unit 120 to vibrate a right region of the display panel 110. The first and second sound generating modules 210 and 220 may receive different vibration signals and may be independently driven. For example, the first sound generating module 210 may generate a sound by using, as a vibration plate, a left region of the display panel 110 vibrated based on the vibration of the backlight unit 120, and the second sound generating module 220 may generate a sound by using a right region of the display panel 110 as a vibration plate.

According to an embodiment, the vibration generating device 200 may be disposed in a region adjacent to an edge of the display module 100. In detail, a vibration having a low frequency domain generated by the at least one sound generating module 210 may be rectilinearly transferred through the backlight unit 120, the gap space 130S between the display panel 110 and the backlight unit 120, and the display panel 110, and thus, a sound having the low frequency domain may be output to a region in front of the display panel 110. Also, a vibration having a high frequency domain generated by the vibration generating device 200 may be sequentially transferred to an edge of the backlight unit 120, the module adhesive member 130, and the display panel 110, and thus, a sound having the high frequency domain may be output to the region in front of the display panel 110. Therefore, the vibration having the low frequency domain may be preferentially transferred to the gap space 130S between the display panel 110 and the backlight unit 120, but the vibration having the high frequency domain may be preferentially transferred to the module adhesive member 130 through the edge of the backlight unit 120. In this manner, if the sound generating module 210 is spaced apart from an edge of the display module 100 by a long distance, a vibration transfer path corresponding to the high frequency domain may extend, and thus, a sound pressure level corresponding to the high frequency domain is reduced. Therefore, the at least one sound generating module 210 may be disposed in a region adjacent to the edge of the display module 100, and thus, a length of a vibration transfer path corresponding to the high frequency domain may be minimized, thereby preventing a sound pressure level corresponding to the high frequency domain from being reduced. As a result, if the vibration generating device 200 is disposed in the region adjacent to the edge of the display module 100, a sound where a sound pressure level corresponding to the high frequency domain is high may be output in comparison with a case where the vibration generating device 200 is spaced apart from the edge of the display module 100 by a long distance.

According to an embodiment, the vibration generating device 200 may be disposed to ensure a degree of freedom in design of the display device 10 without any reduction in rigidity of the rear cover 310 and to minimize a length of the vibration transfer path corresponding to the high frequency domain. In detail, the vibration generating device 200 may be inserted into the perforating part 311 of the rear cover 310, and a position of the perforating part 311 of the rear cover 310 may be set so as not to decrease the rigidity of the rear cover 310. In this case, if the perforating part 311 of the rear cover 310 is very adjacent to the adhesive member 500, the rigidity of the rear cover 310 is reduced. Also, if the perforating part 311 of the rear cover 310 is disposed in the edge of the display module 100 so as to be exposed at one side of the display device 10, a degree of freedom in design of the display device 10 is reduced. Therefore, the perforating part 311 of the rear cover 310 may be disposed adjacent to the edge of the display module 100 within a range which enables the rigidity of the rear cover 310 not to be reduced. Also, the vibration generating device 200 may be disposed so as not to be exposed at one side of the display device 10, thereby enhancing a degree of freedom in design of the display device 10. As a result, the vibration generating device 200 may be disposed based on a position of the perforating part 311 of the rear cover 310 so as to ensure a degree of freedom in design of the display device 10 without any reduction in rigidity of the rear cover 310 and to minimize the length of the vibration transfer path corresponding to the high frequency domain According to an embodiment, the vibration generating device 200 may be a speaker, and for example, may be a sound actuator, a sound exciter, or a piezoelectric element, but is not limited thereto. In other embodiments, the vibration generating device 200 may be a sound device for outputting a sound according an electrical signal.

The rear structure 300 may surround a side surface and the rear surface 120b of the backlight unit 120. For example, the rear structure 300 may surround the side surface and the rear surface 120b of the backlight unit 120 and may support the vibration generating device 200.

The rear structure 300 may include the rear cover 310 covering the rear surface 120b of the backlight unit 120 and a side cover member 330 surrounding the side surface of the backlight unit 120. The rear cover 310 may cover the whole rear surface 120b of the backlight unit 120 so as to be spaced apart from the rear surface 120b and may have a plate shape formed of a glass, a metal material, or a plastic material. Here, an edge or a sharp corner of the rear cover 310 may have a tetragonal shape or a curved shape through a chamfer process or a corner rounding process. According to an embodiment, the rear cover 310 including the glass material may include sapphire glass. For example, the rear cover 310 including the metal material may be formed of one of aluminum (Al), an Al alloy, a magnesium (Mg) alloy, and an iron (Fe)-nickel (Ni) alloy. As another example, the rear cover 310 may have a stacked structure including a glass plate, which has a thickness relatively thinner than a metal plate and a glass plate and faces the rear surface 120b of the backlight unit 120, and in this case, a rear surface of the display device may be used as a mirror surface due to the metal plate.

The rear cover 310 may include the perforating part 311 into which a portion of the vibration generating device 200 is inserted. The perforating part 311 may be perforated in a predetermined partial region of the rear cover 310 along a thickness direction of the rear cover 310 to have a circular shape or a polygonal shape.

The side cover member 330 may surround the side surface of the backlight unit 120 and may prevent the side light leakage of the display device. For example, the side cover member 330 may be disposed between a front edge of the rear structure 300 and a rear edge, except one edge, of a rear surface of the rear structure 300 and may seal a space between the display panel 110 and the rear structure 300. Therefore, the side cover member 330 prevents light, irradiated from the backlight unit 120 onto the display panel 110, from being leaked to the outside through a side surface of the display device. According to an embodiment, the side cover member 330 may include a foam pad, a foam tape, a foam resin, and/or the like. For example, the side cover member 330 may include an acryl-based material or a urethane-based material, and for example, in order to minimize the vibration of the display panel 110 transferred to the rear cover 310, the side cover member 330 may include the urethane-based material having a ductile characteristic which is relatively better than the acryl-based material. The side cover member 330 may seal a space between the rear structure 300 and the display panel 110 exposed at the outside of the display device, thereby improving an aesthetic design appearance of the display device.

Moreover, the side cover member 330 may be omitted based on a coupling structure between the display panel 110, the backlight unit 120, and the rear cover 310.

The vibration transfer member 400 may be disposed between the vibration generating device 200 and the display module 100. In detail, the vibration transfer member 400 may be disposed between the at least one sound generating module 210 and the backlight unit 120 and may extend from the at least one sound generating module 210 to an edge of the display module 100. Therefore, the vibration transfer member 400 may transfer a vibration, generated by the at least one sound generating module 210, to the edge of the display module 100. For example, a vibration having the low frequency domain generated by the at least one sound generating module 210 may be rectilinearly transferred through the backlight unit 120, the gap space 130S between the display panel 110 and the backlight unit 120, and the display panel 110, and thus, a sound having the low frequency domain may be output to the region in front of the display panel 110. Also, a vibration having the high frequency domain generated by the vibration generating device 200 may be sequentially transferred to the edge of the backlight unit 120, the module adhesive member 130, and the display panel 110, and thus, a sound having the high frequency domain may be output to the region in front of the display panel 110. Therefore, the vibration having the low frequency domain may be preferentially transferred to the gap space 130S between the display panel 110 and the backlight unit 120, but the vibration having the high frequency domain may be preferentially transferred to the edge of the backlight unit 120 and the module adhesive member 130 through the vibration transfer member 400. In this case, the vibration transfer member 400 may include a material having a vibration transfer characteristic which is better than that of the display module 100, and thus, may guide a transfer direction of the vibration having the high frequency domain, thereby minimizing the loss of a sound pressure level corresponding to the high frequency domain. Therefore, the vibration transfer member 400 may transfer the vibration having the high frequency domain generated by the sound generating module 210 to the edge of the display module 100, thereby preventing the sound pressure level corresponding to the high frequency domain from being reduced. Accordingly, the vibration transfer member 400 prevents the sound pressure level corresponding to the high frequency domain from being reduced, thereby enhancing flatness of the sound pressure level in a whole frequency domain and enhancing clearness of a sound.

According to an embodiment, the vibration transfer member 400 may overlap the perforating part 311 and may extend to the edge of the display module 100. In detail, the sound generating module 210 may be inserted into the perforating part 311 and may be connected to one end of the vibration transfer member 400 attached on the rear surface 120b of the backlight unit 120. Therefore, a position of the sound generating module 210 may be determined based on a position of the perforating part 311, and the sound generating module 210 may transfer a vibration to the one end of the vibration transfer member 400. As a result, since the vibration transfer member 400 overlaps the perforating part 311 and extends to the edge of the display module 100, the vibration transfer member 400 may sequentially transfer a vibration, transferred from the sound generating module 210 overlapping the perforating part 311, to the edge of the backlight unit 120, the module adhesive member 130, and the display panel 110, and thus, a sound having the high frequency domain may be output to the region in front of the display panel 110.

According to an embodiment, the vibration transfer member 400 may include a material having high elasticity and may be implemented to have a vibration transfer characteristic which is better than that of the display panel 110. For example, the vibration transfer member 400 may include metal such as Al, copper (Cu), or stainless having an excellent vibration transfer characteristic, or may include a tempered plastic compound. Therefore, since the vibration transfer member 400 is implemented to have a vibration transfer characteristic which is better than that of the display panel 110, the vibration transfer member 400 may induce a path of a vibration generated by the vibration generating device 200 and may prevent a sound pressure level, output to the region in front of the display panel 110, from being reduced. Also, the vibration transfer member 400 may be implemented to have an excellent vibration transfer characteristic corresponding to the high frequency domain, thereby enhancing flatness of the sound pressure level in a whole frequency domain.

According to an embodiment, the vibration transfer member 400 may include a material having an excellent heat transfer characteristic. For example, the vibration transfer member 400 may transfer heat, occurring in the sound generating module 210, to the edge of the display module 100 to dissipate the heat to the outside. For example, the vibration transfer member 400 may include metal such as Al, Cu, or stainless having a high thermal conductivity, or may include a tempered plastic compound. Therefore, the vibration transfer member 400 may transfer a vibration generated by the sound generating module 210 to the edge of the display module 100, and simultaneously, may dissipate the heat, occurring in the sound generating module 210, to the outside.

The adhesive member 500 may be disposed between the edge of the display module 100 and an edge of the rear structure 300. In detail, the adhesive member 500 may be disposed between the backlight unit 120 and the rear structure 300 to have a certain thickness (or height) and may have a sealing structure having a four-side-sealed type or a closed loop type. The adhesive member 500 may be provided between a rear edge of the backlight unit 120 and a front edge of the rear structure 300 and may couple the rear cover 310 of the rear structure 300 to the rear surface 120b of the backlight unit 120, thereby a gap space 500S between the rear surface 120b of the backlight unit 120 and the front surface 310a of the rear cover 310. Here, the gap space 500S may be used as an insertion space, where a portion of the vibration generating device 200 inserted into the perforating part of the rear structure 300 is disposed, and a panel vibration space which enables a vibration of the backlight unit 120 based on driving of the vibration generating device 200. Also, the gap space 130S provided between the backlight unit 120 and the rear cover 310 prevents the light of the backlight unit 120 from non-uniformly concentrating on a specific position, thereby enhancing the light luminance uniformity of the display device 10.

According to an embodiment, the adhesive member 500 may be separated into two portions with the vibration transfer member 400 therebetween. For example, the adhesive member 500 may be cut so that the two portions are spaced apart from each other by a width of the vibration transfer member 400, and thus, may contact both side surfaces of the vibration transfer member 400. In detail, if the vibration transfer member 400 overlaps the sound generating module 210 and extends to the edge of the display module 100, the both side surfaces of the vibration transfer member 400 may contact the adhesive member 500. Here, if a lengthwise direction of the vibration transfer member 400 is a long-side direction of the display device 10, a lengthwise direction of the adhesive member 500 contacting the vibration transfer member 400 may correspond to a short-side direction of the display device 10. Therefore, the vibration transfer member 400 may pass through the adhesive member 500 and may extend to the edge of the display module 100, and thus, may transfer a vibration having the high frequency domain generated by the vibration generating device 200 to the edge of the backlight unit 120, the module adhesive member 130, and the display panel 110 in a state of minimizing the loss of a sound pressure level.

According to an embodiment, the adhesive member 500 may include an optically clear resin (OCR), an optically clear adhesive (OCA) film, a double-sided tape, and/or the like.

According to an embodiment, a whole front surface of the vibration transfer member 400 may contact the rear surface of the backlight unit 120, a rear surface of one end of the vibration transfer member 400 may contact a whole front surface of the sound generating module 210, and both side surfaces of the other end of the vibration transfer member 400 may contact the adhesive member 500. Also, a rear surface of the other end of the vibration transfer member 400 may be spaced apart from a front surface of the rear cover 310. For example, the rear surface of the other end of the vibration transfer member 400 may face the front surface of the rear cover 310 with the gap space 500S therebetween. Therefore, the vibration transfer member 400 may pass through the adhesive member 500 and may extend to the edge of the display module 100, and thus, may transfer a vibration having the high frequency domain to the edge of the backlight unit 120, thereby preventing a sound pressure level from being reduced.

Figure 5:
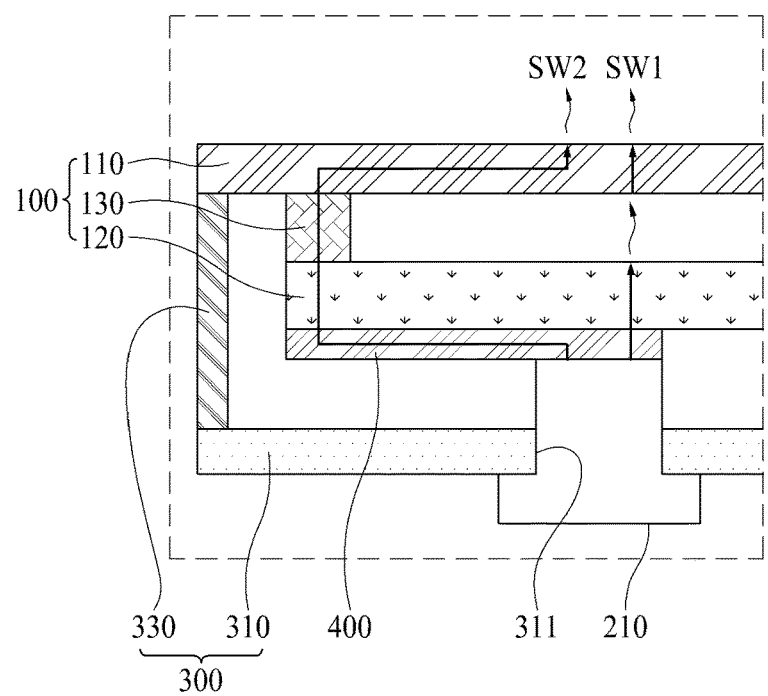
FIG. 5 is a cross-sectional view illustrating a vibration transfer path in a region A of FIG. 3.

FIG. 5 is a cross-sectional view illustrating a vibration transfer path in a region A of FIG. 3.

Referring to FIG. 5, the vibration transfer member 400 may transfer a vibration, generated by the at least one sound generating module 210, to the edge of the display module 100. For example, a vibration having the low frequency domain generated by the at least one sound generating module 210 may be rectilinearly transferred through the backlight unit 120, the gap space 130S between the display panel 110 and the backlight unit 120, and the display panel 110, and thus, a sound SW1 having the low frequency domain may be output to the region in front of the display panel 110. Also, a vibration having the high frequency domain generated by the vibration generating device 200 may be sequentially transferred to the edge of the backlight unit 120, the module adhesive member 130, and the display panel 110, and thus, a sound SW2 having the high frequency domain may be output to the region in front of the display panel 110. Therefore, the vibration having the low frequency domain may be preferentially transferred to the gap space 130S between the display panel 110 and the backlight unit 120, but the vibration having the high frequency domain may be preferentially transferred to the edge of the backlight unit 120 and the module adhesive member 130 through the vibration transfer member 400. In this case, the vibration transfer member 400 may include a material having a vibration transfer characteristic which is better than that of the display module 100, and thus, may guide a transfer direction of the vibration having the high frequency domain, thereby minimizing the loss of a sound pressure level corresponding to the high frequency domain. Therefore, the vibration transfer member 400 may transfer the vibration having the high frequency domain generated by the sound generating module 210 to the edge of the display module 100, thereby preventing the sound pressure level corresponding to the high frequency domain from being reduced. Accordingly, the vibration transfer member 400 prevents the sound pressure level corresponding to the high frequency domain from being reduced, thereby enhancing flatness of the sound pressure level in a whole frequency domain and enhancing clearness of the sound SW2.

According to an embodiment, the vibration generating device 200 may be disposed in a region adjacent to the edge of the display module 100. In detail, the vibration having the low frequency domain may be preferentially transferred to the gap space 130S between the display panel 110 and the backlight unit 120, but the vibration having the high frequency domain may be preferentially transferred to the module adhesive member 130 through the edge of the backlight unit 120. In this manner, if the sound generating module 210 is spaced apart from the edge of the display module 100 by a long distance, a vibration transfer path corresponding to the high frequency domain may extend, and thus, a sound pressure level corresponding to the high frequency domain is reduced. Therefore, the at least one sound generating module 210 may be disposed in a region adjacent to the edge of the display module 100, and thus, a length of a vibration transfer path corresponding to the high frequency domain may be minimized, thereby preventing a sound pressure level corresponding to the high frequency domain from being reduced. As a result, if the vibration generating device 200 is disposed in the region adjacent to the edge of the display module 100, the sound SW2 where a sound pressure level corresponding to the high frequency domain is high may be output in comparison with a case where the vibration generating device 200 is spaced apart from the edge of the display module 100 by a long distance.

Figure 6:
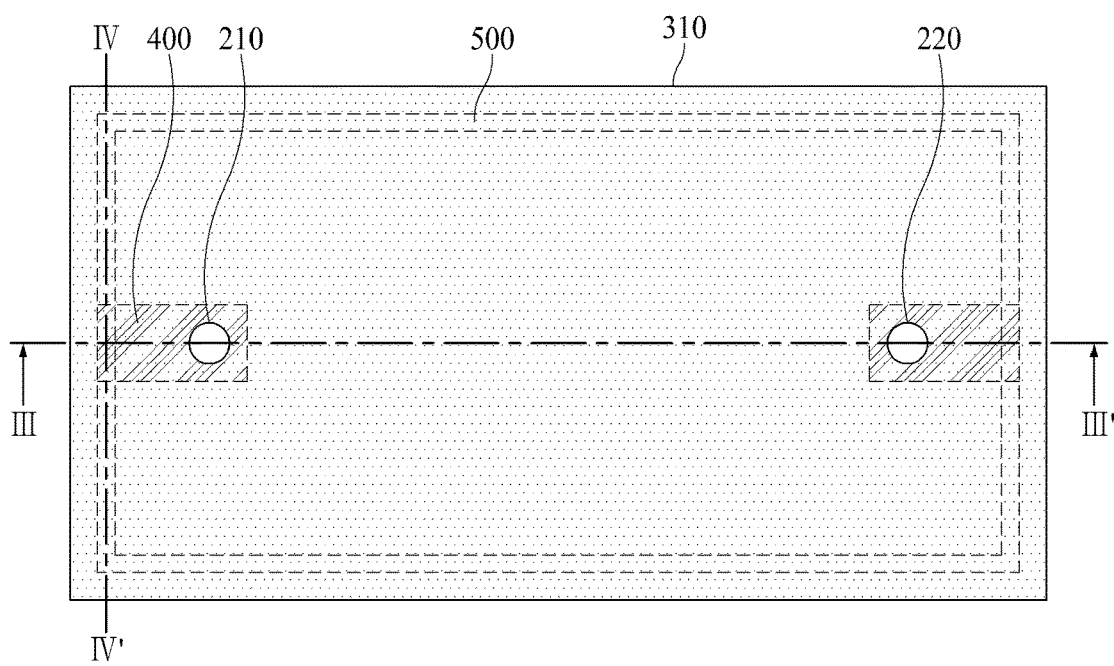
FIG. 6 is a rear view of a display device according to a second embodiment of the present disclosure.
Figure 7:
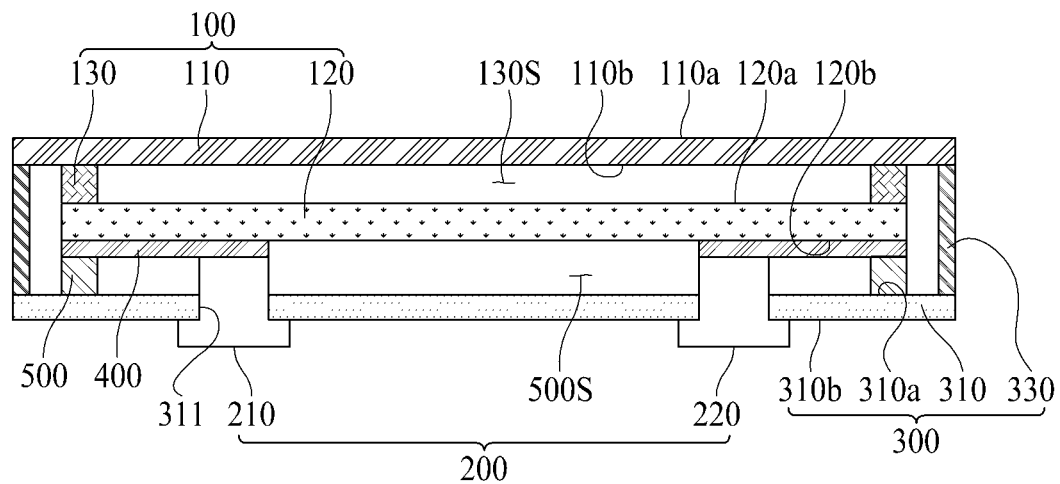
FIG. 7 is a cross-sectional view taken along line of FIG. 6.
Figure 8:
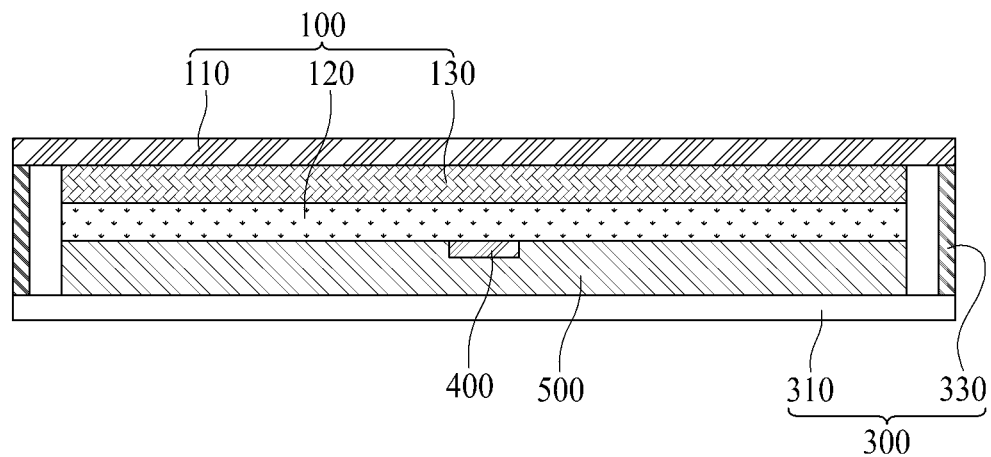
FIG. 8 is a cross-sectional view taken along line IV-IV' of FIG. 6.

FIG. 6 is a rear view of a display device according to a second embodiment of the present disclosure. FIG. 7 is a cross-sectional view taken along line of FIG. 6. FIG. 8 is a cross-sectional view taken along line IV-IV' of FIG. 6. Here, the display device according to the second embodiment of the present disclosure may be implemented by modifying only the elements of each of the vibration transfer 400 and the adhesive member 500 of the display device according to the first embodiment, and thus, the same elements as the above-described elements are omitted or will be briefly described below.

Referring to FIGS. 6 to 8, an adhesive member 500 may be disposed between a rear surface of a vibration transfer member 400 and a rear structure 300. For example, the adhesive member 500 may be cut so that the two portions are spaced apart from each other by a width of the vibration transfer member 400, and thus, may contact a rear surface and both side surfaces of the vibration transfer member 400. In detail, if the vibration transfer member 400 overlaps a sound generating module 210 and extends to an edge of a display module 100, the both side surfaces and the rear surface of the vibration transfer member 400 may contact the adhesive member 500. Here, if a lengthwise direction of the vibration transfer member 400 is a long-side direction of the display device, a lengthwise direction of the adhesive member 500 contacting the vibration transfer member 400 may correspond to a short-side direction of the display device. Therefore, the vibration transfer member 400 may pass through the adhesive member 500 and may extend to the edge of the display module 100, and thus, may transfer a vibration having the high frequency domain generated by a vibration generating device 200 to an edge of a backlight unit 120, a module adhesive member 130, and the display panel 110 in a state of minimizing the loss of a sound pressure level.

According to an embodiment, a rear surface of one end of the vibration transfer member 400 may receive a vibration of the sound generating module 210 in contact with the sound generating module 210, and a rear surface of the other end of the vibration transfer member 400 may be supported by the adhesive member 500. In detail, the adhesive member 500 may support the rear surface of the other end of the vibration transfer member 400 in a region where the edge of the display module 100 overlaps the other end of the vibration transfer member 400. Also, the adhesive member 500 may support a rear surface of the edge of the display module 100 except a region, overlapping the other end of the vibration transfer member 400, of the edge of the display module 100. Therefore, the adhesive member 500 may support the rear surface of the other end of the vibration transfer member 400 and the rear surface of the edge of the display module 100.

According to an embodiment, a whole front surface of the vibration transfer member 400 may contact a rear surface of the backlight unit 120, a rear surface of one end of the vibration transfer member 400 may contact a whole front surface of the sound generating module 210, and a rear surface and both side surfaces of the other end of the vibration transfer member 400 may contact the adhesive member 500. Also, a rear surface of the other end of the vibration transfer member 400 may be supported by the adhesive member 500. Therefore, the vibration transfer member 400 may pass through the adhesive member 500 and may extend to the edge of the display module 100, and thus, may transfer a vibration having the high frequency domain to the edge of the backlight unit 120, thereby preventing a sound pressure level from being reduced.

Figure 9:
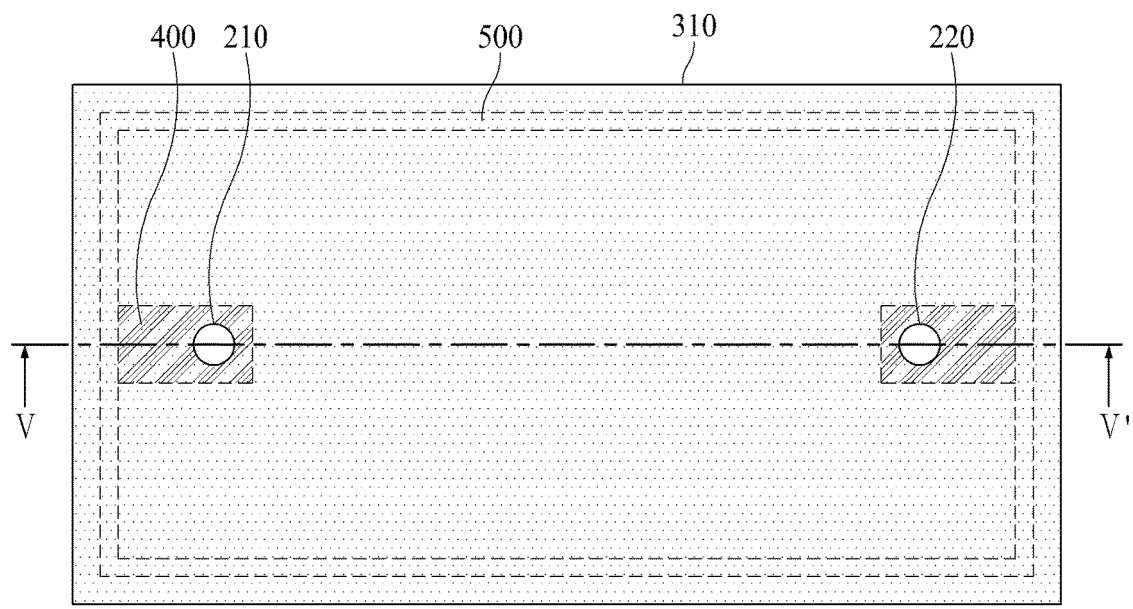
FIG. 9 is a rear view of a display device according to a third embodiment of the present disclosure.
Figure 10:
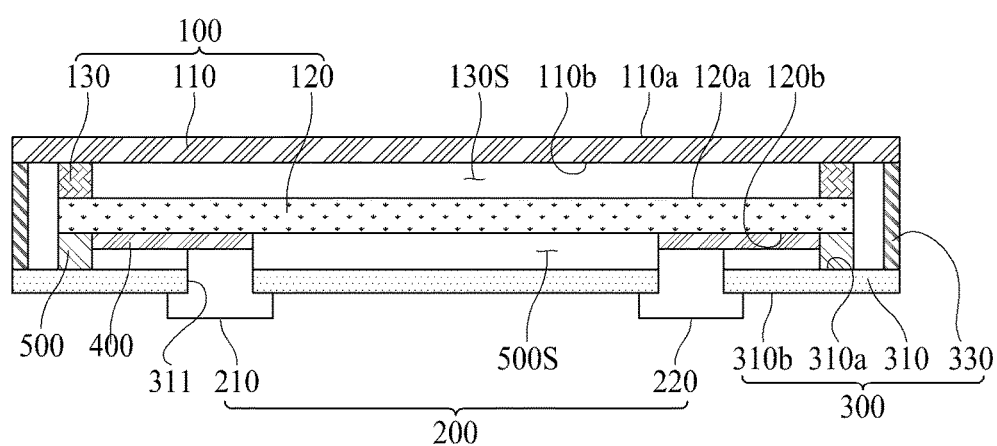
FIG. 10 is a cross-sectional view taken along line V-V' of FIG. 9.

FIG. 9 is a rear view of a display device according to a third embodiment of the present disclosure, and FIG. 10 is a cross-sectional view taken along line V-V' of FIG. 9. Here, the display device according to the third embodiment of the present disclosure may be implemented by modifying only the elements of the vibration transfer 400 and the adhesive member 500 of the display device according to the first and second embodiments, and thus, the same elements as the above-described elements are omitted or will be briefly described below.

Referring to FIGS. 9 to 10, a vibration transfer member 400 may extend from at least one sound generating module 210 to a side surface of an adhesive member 500. For example, the vibration transfer member 400 may extend from a rear surface of a display module 100 along a shortest distance between the sound generating module 210 and the adhesive member 500. In detail, if the vibration transfer member 400 overlaps the sound generating module 210 and extends to a side surface of the adhesive member 500, a side surface of the other end of the vibration transfer member 400 may contact the side surface of the adhesive member 500. Here, if a lengthwise direction of the vibration transfer member 400 is a long-side direction of the display device, a lengthwise direction of the adhesive member 500 contacting the vibration transfer member 400 may correspond to a short-side direction of the display device. Therefore, the vibration transfer member 400 may extend to a side surface of the adhesive member 500 which is disposed along an edge of the display module 100, and thus, may transfer a vibration having the high frequency domain generated by a vibration generating device 200 to an edge of a backlight unit 120, a module adhesive member 130, and the display panel 110 in a state of minimizing the loss of a sound pressure level.

According to an embodiment, a whole front surface of the vibration transfer member 400 may contact a rear surface of the backlight unit 120, a rear surface of one end of the vibration transfer member 400 may contact a whole front surface of the sound generating module 210, and a side surface of the other end of the vibration transfer member 400 may contact a side surface of the adhesive member 500. Therefore, the vibration transfer member 400 may extend to the side surface of the display module 100 along an edge of the display module 100, and thus, may transfer a vibration having the high frequency domain to the edge of the backlight unit 120, thereby preventing a sound pressure level from being reduced.

Figure 11:
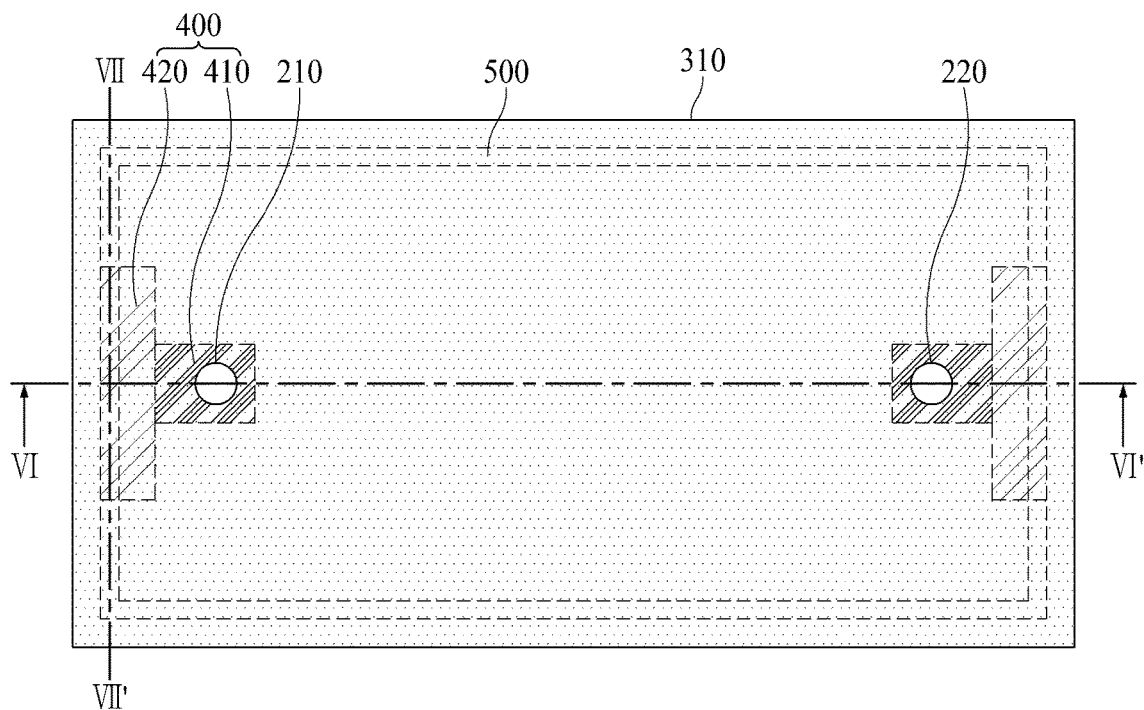
FIG. 11 is a rear view of a display device according to a fourth embodiment of the present disclosure.
Figure 12:
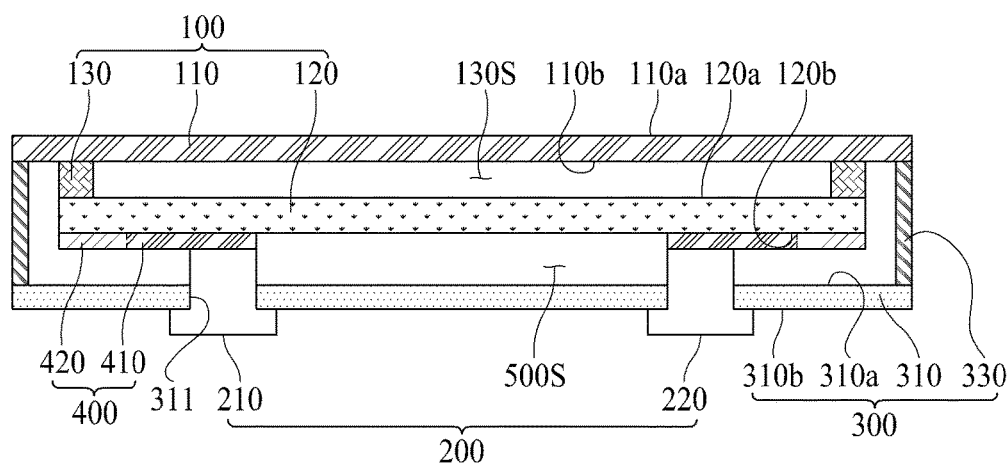
FIG. 12 is a cross-sectional view taken along line VI-VI' of FIG. 11.
Figure 13:
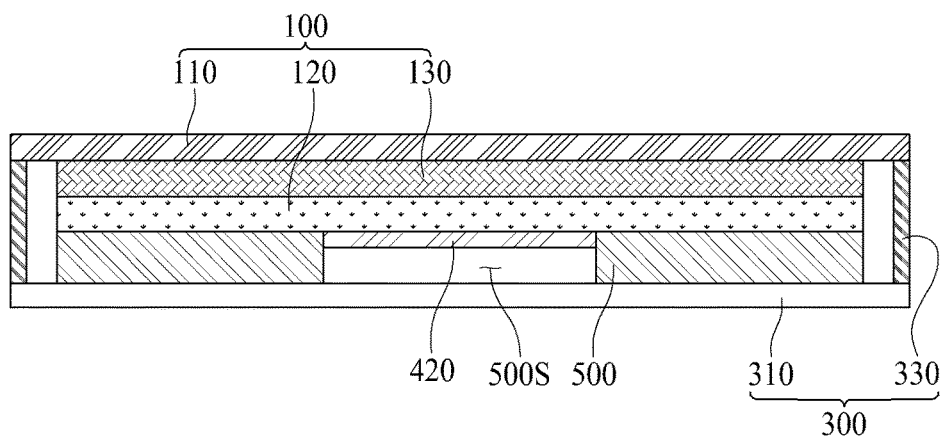
FIG. 13 is a cross-sectional view taken along line VII-VII' of FIG. 11.

FIG. 11 is a rear view of a display device according to a fourth embodiment of the present disclosure. FIG. 12 is a cross-sectional view taken along line VI-VI' of FIG. 11. FIG. 13 is a cross-sectional view taken along line VII-VII' of FIG. 11. Here, the display device according to the fourth embodiment of the present disclosure may be implemented by modifying only the elements of each of the vibration transfer 400 and the adhesive member 500 of the display device according to the first to third embodiments, and thus, the same elements as the above-described elements are omitted or will be briefly described below.

Referring to FIGS. 11 to 13, a vibration transfer member 400 may include first and second vibration transfer parts 410 and 420. The first vibration transfer part 410 may extend from at least one sound generating module 210 to an edge of a display module 100, and the second vibration transfer part 420 may be connected to the first vibration transfer part 410 and may be disposed along an edge of the display module 100. Here, the first vibration transfer part 410 may extend along a long-side direction of the display device, and the second vibration transfer part 420 may extend along a short-side direction of the display device. Therefore, the first vibration transfer part 410 may transfer a vibration, transferred from the sound generating module 210, to second vibration transfer part 420, and the second vibration transfer part 420 may transfer the vibration, transferred from the first vibration transfer part 410, to an edge of the display module 100. Here, the second vibration transfer part 420 may be disposed along the edge of the display module 100, and thus, may transfer a vibration having the high frequency domain to the edge of the display module 100. For example, as a width of a region overlapping the display module 100 increases, the second vibration transfer part 420 may better transfer the vibration having the high frequency domain to the edge of the display module 100. Therefore, since the vibration transfer member 400 includes the first and second vibration transfer parts 410 and 420, a vibration transfer characteristic corresponding to the high frequency domain is enhanced in proportion to a width of the second vibration transfer part 420, thereby preventing a sound pressure level corresponding to the high frequency domain from being reduced. Accordingly, the vibration transfer member 400 prevents the sound pressure level corresponding to the high frequency domain from being reduced, thereby enhancing flatness of the sound pressure level in a whole frequency domain and enhancing clearness of a sound.

According to an embodiment, the adhesive member 500 may be separated into two portions with the second vibration transfer part 420 therebetween. For example, the adhesive member 500 may be cut so that the two portions are spaced apart from each other by a length of the second vibration transfer part 420, and thus, may contact both side surfaces of the second vibration transfer part 420. In detail, if the first vibration transfer part 410 overlaps the sound generating module 210 and extends to the second vibration transfer part 420 disposed in the edge of the display module 100, the both side surfaces of the second vibration transfer part 420 may contact the adhesive member 500. Here, if a lengthwise direction of the first vibration transfer part 410 is a long-side direction of the display device, a lengthwise direction of the second vibration transfer part 420 may correspond to a short-side direction of the display device. Therefore, the second vibration transfer part 420 may pass through the adhesive member 500 and may be disposed along the edge of the display module 100, and thus, may transfer a vibration having the high frequency domain generated by the vibration generating device 200 to the edge of the backlight unit 120, the module adhesive member 130, and the display panel 110 in a state of minimizing the loss of a sound pressure level.

According to an embodiment, a whole front surface of each of the first and second vibration transfer parts 410 and 420 may contact the rear surface of the backlight unit 120, a rear surface of one end of the first vibration transfer part 410 may contact a whole front surface of the sound generating module 210, and both side surfaces of the second vibration transfer part 420 may contact the adhesive member 500. Also, a rear surface of each of the first and second vibration transfer parts 410 and 420 may be spaced apart from a front surface of a rear cover 310. For example, the rear surface of each of the first and second vibration transfer parts 410 and 420 may face the front surface of the rear cover 310 with a gap space 500S therebetween. Therefore, the second vibration transfer member 420 may pass through the adhesive member 500 and may be disposed along the edge of the display module 100, and thus, a vibration transfer characteristic corresponding to the high frequency domain is enhanced in proportion to a width of a region overlapping the edge of the display module 100, thereby preventing a sound pressure level corresponding to the high frequency domain from being reduced. Accordingly, the vibration transfer member 400 prevents the sound pressure level corresponding to the high frequency domain from being reduced, thereby enhancing flatness of the sound pressure level in a whole frequency domain and enhancing clearness of a sound.

Figure 14:
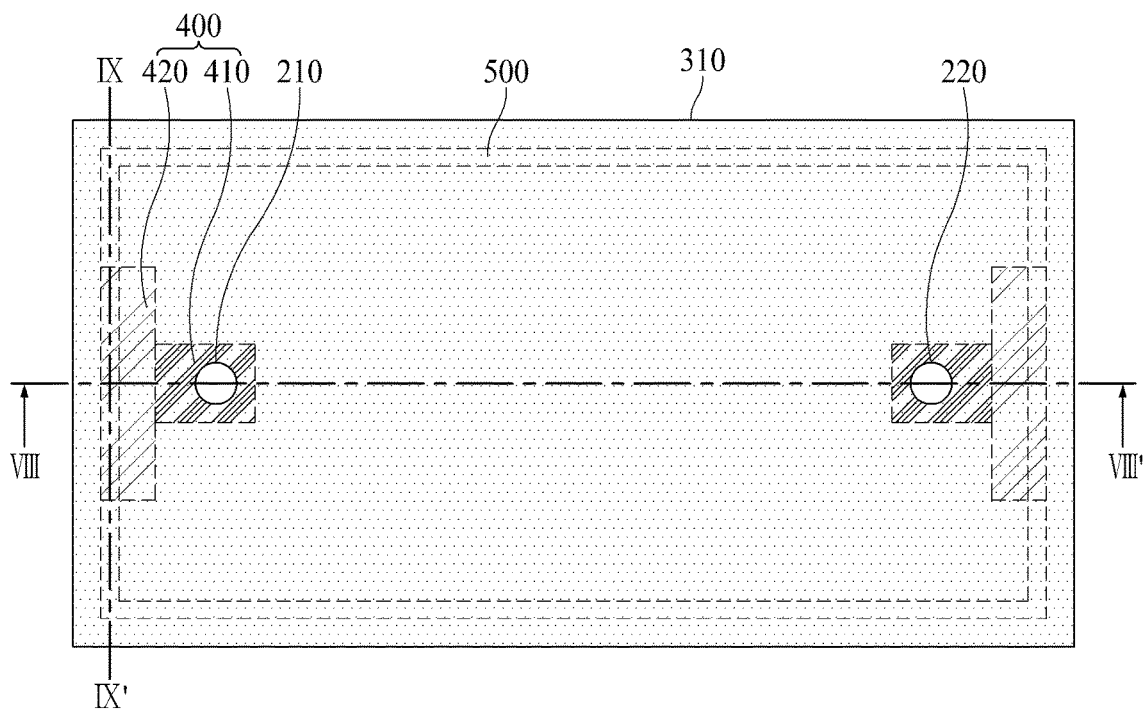
FIG. 14 is a rear view of a display device according to a fifth embodiment of the present disclosure.
Figure 15:
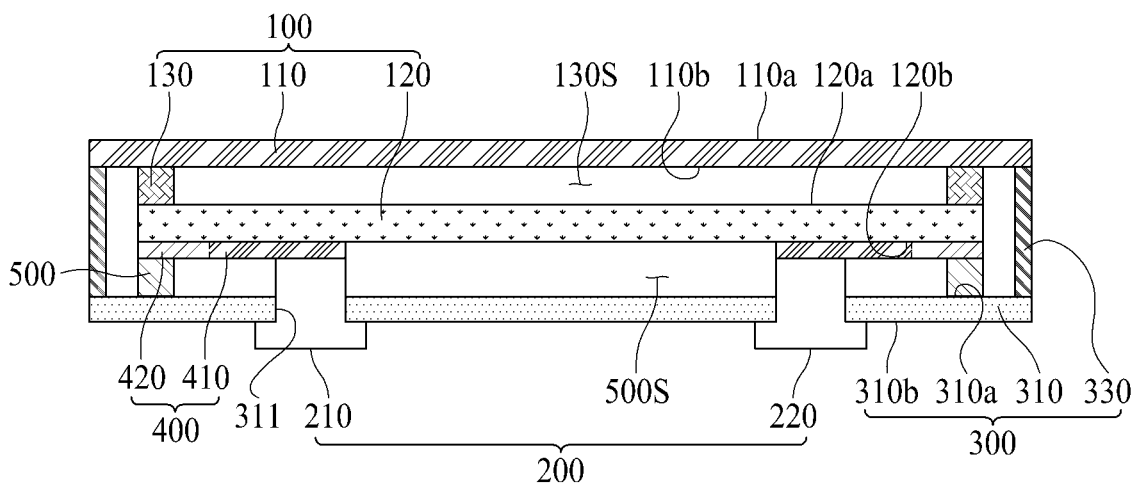
FIG. 15 is a cross-sectional view taken along line VIII-VIII' of FIG. 14.
Figure 16:
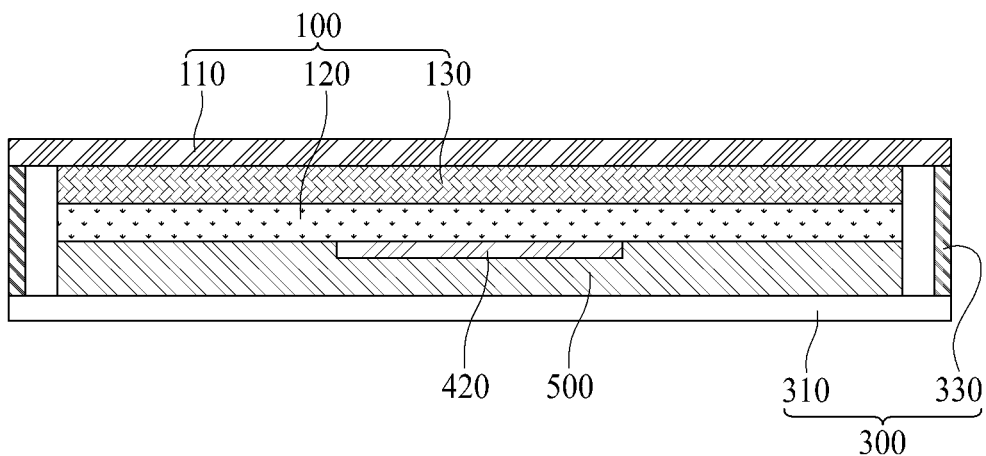
FIG. 16 is a cross-sectional view taken along line IX-IX' of FIG. 14.

FIG. 14 is a rear view of a display device according to a fifth embodiment of the present disclosure. FIG. 15 is a cross-sectional view taken along line VIII-VIII' of FIG. 14. FIG. 16 is a cross-sectional view taken along line IX-IX' of FIG. 14. Here, the display device according to the fifth embodiment of the present disclosure may be implemented by modifying only the elements of each of the vibration transfer 400 and the adhesive member 500 of the display device according to the first to fourth embodiments, and thus, the same elements as the above-described elements are omitted or will be briefly described below.

Referring to FIGS. 14 to 16, an adhesive member 500 may be disposed between a rear surface of a second vibration transfer part 420 and a rear cover 310. For example, an adhesive member 500 may be cut so that the two portions are spaced apart from each other by a width of the second vibration transfer part 420, and thus, may surround a rear surface and both side surfaces of the second vibration transfer part 420. In detail, if the first vibration transfer part 410 overlaps a sound generating module 210 and extends to the second vibration transfer part 420 which is disposed along an edge of a display module 100, the both side surfaces and the rear surface of the second vibration transfer part 420 may contact the adhesive member 500. Here, if a lengthwise direction of the first vibration transfer part 410 is a long-side direction of the display device, a lengthwise direction of the second vibration transfer part 420 may correspond to a short-side direction of the display device. Therefore, the second vibration transfer part 420 may pass through the adhesive member 500 and may be disposed along the edge of the display module 100, and thus, a vibration transfer characteristic corresponding to the high frequency domain is enhanced in proportion to a width of a region overlapping the edge of the display module 100, whereby the second vibration transfer part 420 may transfer a vibration having the high frequency domain to an edge of a backlight unit 120, a module adhesive member 130, and the display panel 110 in a state of minimizing the loss of a sound pressure level.

According to an embodiment, a rear surface of one end of the first vibration transfer part 410 may receive a vibration of the sound generating module 210 in contact with the sound generating module 210, and a rear surface of the second vibration transfer part 420 may be supported by the adhesive member 500. In detail, the adhesive member 500 may support the rear surface of the second vibration transfer part 420, in a region where the edge of the display module 100 overlaps the second vibration transfer part 420. Also, the adhesive member 500 may support a rear surface of the edge of the display module 100 except a region, overlapping the second vibration transfer part 420, of the edge of the display module 100. Therefore, the adhesive member 500 may support the rear surface of the second vibration transfer member 420 and the rear surface of the edge of the display module 100.

According to an embodiment, a whole front surface of each of the first and second vibration transfer parts 410 and 420 may contact the rear surface of the backlight unit 120, a rear surface of one end of the first vibration transfer part 410 may contact a whole front surface of the sound generating module 210, and a rear surface and both side surfaces of the second vibration transfer part 420 may contact the adhesive member 500. Also, a rear surface of the second vibration transfer part 420 may be supported by the adhesive member 500. Therefore, the second vibration transfer member 420 may pass through the adhesive member 500 and may be disposed along the edge of the display module 100, and thus, a vibration transfer characteristic corresponding to the high frequency domain is enhanced in proportion to a width of a region overlapping the edge of the display module 100. Accordingly, a vibration having the high frequency domain may be transferred to the edge of the backlight unit 120, thereby preventing a sound pressure level from being reduced.

Figure 17:
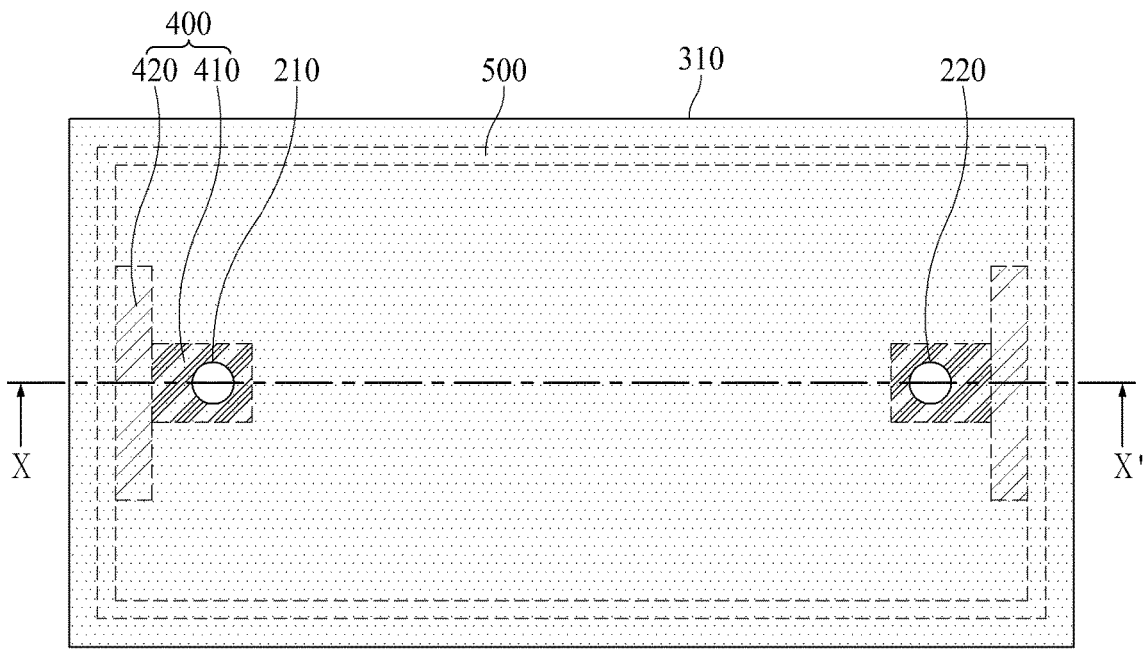
FIG. 17 is a rear view of a display device according to a sixth embodiment of the present disclosure.
Figure 18:
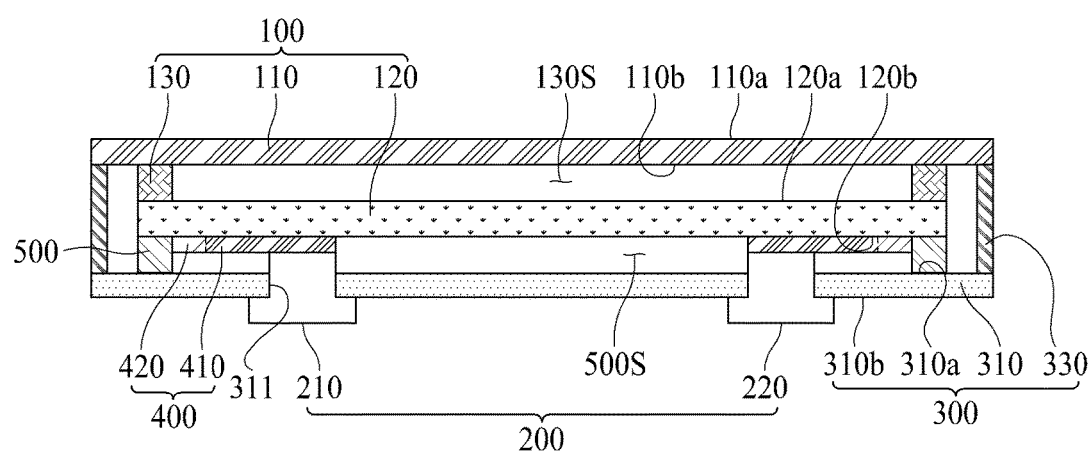
FIG. 18 is a cross-sectional view taken along line X-X' of FIG. 17.

FIG. 17 is a rear view of a display device according to a sixth embodiment of the present disclosure, and FIG. 18 is a cross-sectional view taken along line X-X' of FIG. 17. Here, the display device according to the sixth embodiment of the present disclosure may be implemented by modifying only the elements of the vibration transfer 400 and the adhesive member 500 of the display device according to the first to fifth embodiments, and thus, the same elements as the above-described elements are omitted or will be briefly described below.

Referring to FIGS. 17 and 18, a first vibration transfer part 410 may extend from at least one sound generating module 210 to a second vibration transfer part 420, and the second vibration transfer part 420 may be disposed in parallel with an adhesive member 500 in contact with a side surface of the adhesive member 500. For example, the first vibration transfer member 410 may extend from a rear surface of a display module 100 along a shortest distance between a sound generating module 210 and the second vibration transfer part 420. In detail, if the first vibration transfer member 410 overlaps the sound generating module 210 and extends to the second vibration transfer part 420, a side surface of the second vibration transfer part 420 may contact the side surface of the adhesive member 500. Here, if a lengthwise direction of the first vibration transfer part 410 is a long-side direction of the display device, a lengthwise direction of the second vibration transfer part 420 may correspond to a short-side direction of the display device. Therefore, since the second vibration transfer part 420 is disposed in parallel with the adhesive member 500 in contact with the side surface of the adhesive member 500, the second vibration transfer part 420 may transfer a vibration having the high frequency domain generated by a vibration generating device 200 to an edge of a backlight unit 120, a module adhesive member 130, and the display panel 110 in a state of minimizing the loss of a sound pressure level in proportion to a width of a region overlapping the edge of the display module 100.

According to an embodiment, a whole front surface of each of the first and second vibration transfer parts 410 and 420 may contact the rear surface of the backlight unit 120, a rear surface of one end of the first vibration transfer part 410 may contact a whole front surface of the sound generating module 210, and a side surface of the other end of the second vibration transfer part 420 may contact the adhesive member 500. Therefore, since the second vibration transfer part 420 is disposed in parallel with the adhesive member 500 in contact with the side surface of the adhesive member 500, the second vibration transfer part 420 minimizes the loss of a sound pressure level of a vibration having the high frequency domain generated by a vibration generating device 200 to an edge of a backlight unit 120 in proportion to a width of a region overlapping the edge of the display module 100.

Figure 19:
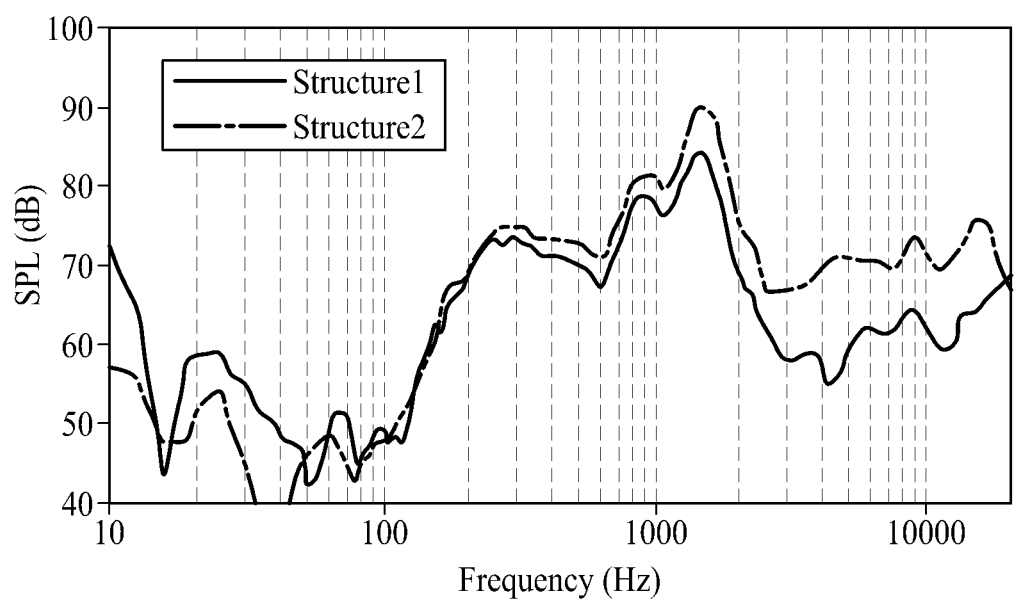
FIG. 19 is a diagram showing an increase in a sound pressure level in a high frequency domain in a display device according to an embodiment of the present disclosure in comparison with the relate art.

FIG. 19 is a diagram showing an increase in a sound pressure level in a high frequency domain in a display device according to an embodiment of the present disclosure in comparison with the relate art. In detail, a first structure (Structure 1) corresponds to a related art display device which does not include a vibration transfer member, and a second structure (Structure 2) corresponds to the display device 10 according to the first embodiment of the present disclosure. Also, it is assumed that the first and second structures include the same elements, except for a vibration transfer member.

Referring to FIG. 19, the related art display device (Structure 1) shows the noticeable reduction in a sound pressure level SPL in a high frequency domain of 2 kHz or more. It can be seen that such a result is because a vibration transfer path of a vibration having the high frequency domain is long and a vibration transfer characteristic of a display module is low, and thus, the vibration having the high frequency domain is attenuated. However, it can be seen that in a display device (Structure 2) according to an embodiment of the present disclosure, the reduction in the sound pressure level SPL in the high frequency domain of 2 kHz or more is reduced in comparison with the related art display device (Structure 1). It can be seen that such a result is because the vibration transfer member 400 guides a vibration transfer direction corresponding to the high frequency domain and a vibration transfer characteristic of the vibration transfer member 400 is higher than that of the display module 100, and thus, attenuation of a vibration having the high frequency domain is reduced.

Therefore, it can be seen that in the display device (Structure 2) according to an embodiment of the present disclosure, flatness of the sound pressure level SPL in a whole frequency domain is more noticeably enhanced than the related art display device (Structure 1). Accordingly, in the display device (Structure 2) according to an embodiment of the present disclosure, the vibration transfer member 400 transfers a vibration having the high frequency domain generated by the sound generating module 210 to the edge of the display module 100, thereby preventing the sound pressure level SPL corresponding to the high frequency domain from being reduced. As a result, the vibration transfer member 400 prevents the sound pressure level SPL corresponding to the high frequency domain from being reduced, thereby enhancing flatness of the sound pressure level SPL in a whole frequency domain and enhancing clearness of a sound.

Therefore, the display device 10 according to the embodiments of the present disclosure may transfer a vibration generated by the vibration generating device 200 to the display panel 110 via the vibration transfer member 400 to prevent a sound pressure level from being reduced, thereby enhancing the quality of a sound output to a region in front of the display panel 110. Also, the display device 10 may include the vibration transfer member 400 for transferring a vibration having the high frequency domain generated by the vibration generating device 200 to the edge of the display module 100, and thus, prevents the sound pressure level corresponding to the high frequency domain from being reduced, thereby enhancing flatness of the sound pressure level in a whole frequency domain and enhancing clearness of a sound. Also, the display device 10 according to the embodiments of the present disclosure prevents the sound pressure level corresponding to the high frequency domain from being reduced, thereby minimizing the loss of consumption power.

As described above, according to the embodiments of the present disclosure, the display device may output a sound to a region in front of the display panel. Accordingly, a position of an image displayed by the display device may match a position of a sound generated by the display device, thereby enhancing an immersiveness of a viewer who is watching the image displayed by the display device.

Moreover, in the display device according to the embodiments of the present disclosure, since the vibration generating device attached on the rear surface of the display panel is provided, a speaker is not separately provided, and thus, a degree of freedom in disposition of elements is enhanced, thereby enhancing an aesthetic appearance of a set device.

Moreover, the display device according to the embodiments of the present disclosure may transfer a vibration, generated by the vibration generating device, to the display panel via the vibration transfer member to prevent a sound pressure level from being reduced, thereby enhancing the quality of a sound output to a region in front of the display panel.

Moreover, the display device according to the embodiments of the present disclosure may include the vibration transfer member for transferring a vibration having the high frequency domain generated by the vibration generating device to the edge of the display module, and thus, prevents a sound pressure level corresponding to the high frequency domain from being reduced, thereby enhancing flatness of the sound pressure level in a whole frequency domain.

Moreover, the display device according to the embodiments of the present disclosure may transfer a vibration having the high frequency domain generated by the vibration generating device to the display panel via the vibration transfer member and the module adhesive member, and thus, prevents a sound pressure level corresponding to the high frequency domain from being reduced, thereby enhancing clearness of a sound.

Moreover, the display device according to the embodiments of the present disclosure prevents a sound pressure level corresponding to the high frequency domain from being reduced, thereby minimizing the loss of consumption power.

It will be apparent to those skilled in the art that various modifications and variations can be made in the display device of the present disclosure without departing from the spirit or scope of the disclosure. Thus, it is intended that the present disclosure covers the modifications and variations of this disclosure provided they come within the scope of the appended claims and their equivalents.

What is claimed is:
1. A display device, comprising:
   a display module displaying an image;
   a vibration generating device including at least one sound generating module vibrating the display module;
   a rear structure disposed on a rear surface of the display module to fix the vibration generating device; and
   a vibration transfer member disposed between the at least one sound generating module and the display module to extend from the at least one sound generating module to an edge of the display module,
   wherein the display module comprises:
      a display panel;
      a backlight unit disposed on a rear surface of the display panel; and
      a module adhesive member disposed between an edge of the display panel and an edge of the backlight unit, and
   wherein one end of the vibration transfer member overlaps with the module adhesive member.

2. The display device of claim 1, further comprising an adhesive member disposed between the edge of the display module and an edge of the rear structure.

3. The display device of claim 2, wherein the adhesive member is separated into two portions with the vibration transfer member therebetween.

4. The display device of claim 3, wherein the adhesive member is cut so that the two portions are spaced apart from each other by a width of the vibration transfer member.

5. The display device of claim 2, wherein the adhesive member is disposed between a rear surface of the vibration transfer member and the rear structure.

6. The display device of claim 5, wherein the adhesive member surrounds the rear surface and both side surfaces of the vibration transfer member.

7. The display device of claim 2, wherein the vibration transfer member extends from the at least one sound generating module to a side surface of the adhesive member.

8. The display device of claim 7, wherein a front surface of the vibration transfer member contacts the display module, and a side surface adjacent to the front surface of the vibration transfer member contacts a side surface of the adhesive member.

9. A display device, comprising:
   a display module displaying an image;
   a vibration generating device including at least one sound generating module vibrating the display module;
   a rear structure disposed on a rear surface of the display module to fix the vibration generating device; and
   a vibration transfer member disposed between the at least one sound generating module and the display module to extend from the at least one sound generating module to an edge of the display module,
   wherein the rear structure comprises a perforating part into which a portion of the at least one sound generating module is inserted, and wherein the vibration transfer member overlaps the perforating part and extends to an edge of the display module.

10. The display device of claim 9, wherein the display module comprises:
   a display panel; and
   a backlight unit disposed on a rear surface of the display panel.

11. The display device of claim 10, further comprising a module adhesive member disposed between an edge of the display panel and an edge of the backlight unit.

12. A display device, comprising:
   a display module displaying an image;
   a vibration generating device including at least one sound generating module vibrating the display module;
   a rear structure disposed on a rear surface of the display module to fix the vibration generating device; and
   a vibration transfer member disposed between the at least one sound generating module and the display module to extend from the at least one sound generating module to an edge of the display module,
   wherein the vibration transfer member comprises:
      a first vibration transfer part extending from the at least one sound generating module to the edge of the display module; and
      a second vibration transfer part connected to the first vibration transfer part and disposed along the edge of the display module.

13. The display device of claim 12, wherein the adhesive member is separated into two portions with the second vibration transfer part therebetween.

14. The display device of claim 12, wherein the adhesive member is disposed between the second vibration transfer part and the rear structure.

15. The display device of claim 14, wherein the adhesive member surrounds a rear surface and both side surfaces of the second vibration transfer part.

16. The display device of claim 12, wherein the second vibration transfer part is disposed in parallel with the adhesive member in contact with a side surface of the adhesive member.

17. The display device of claim 12, wherein the display module comprises:
   a display panel; and
   a backlight unit disposed on a rear surface of the display panel.

* * * * *